United States Patent [19]  
Wolinski et al.

[11] 4,200,480  
[45] * Apr. 29, 1980

[54] ADHESIVE JOINING OF PIPES

[75] Inventors: Leon E. Wolinski, Cheektowaga; Peter D. Berezuk, Kenmore, both of N.Y.

[73] Assignee: Pratt & Lambert, Inc., Buffalo, N.Y.

[*] Notice: The portion of the term of this patent subsequent to Nov. 21, 1995, has been disclaimed.

[21] Appl. No.: 849,234

[22] Filed: Nov. 7, 1977

Related U.S. Application Data

[63] Continuation-in-part of Ser. No. 705,333, Jul. 14, 1976, Pat. No. 4,080,238, and a continuation-in-part of Ser. No. 763,145, Jan. 27, 1977, Pat. No. 4,126,504.

[51] Int. Cl.$^2$ .................................. B29C 19/00
[52] U.S. Cl. ............................... 156/294; 156/310; 156/331; 156/334; 156/314; 156/332; 285/423; 285/DIG. 20; 427/302; 428/36; 428/307; 428/420; 525/126
[58] Field of Search ........... 156/294, 331, 305, 332, 156/310, 334, 314; 427/302, 400; 428/36, 420, 307; 260/879, 885; 285/423, DIG. 20

[56] References Cited
U.S. PATENT DOCUMENTS

| | | | |
|---|---|---|---|
| 2,498,831 | 2/1950 | Veitch | 285/423 |
| 2,894,932 | 7/1959 | Bäsel et al. | 156/332 |
| 3,262,803 | 7/1966 | Bäsel et al. | 260/885 |
| 3,315,380 | 4/1967 | Mack et al. | 156/310 |
| 3,395,105 | 7/1968 | Washburn et al. | 156/330 |
| 3,666,597 | 5/1972 | Parnell | 156/305 |
| 3,832,274 | 8/1974 | Owston | 260/879 |
| 3,994,764 | 11/1976 | Wolinski | 156/332 |
| 4,022,500 | 5/1977 | Van den Beld | 285/423 |
| 4,126,504 | 11/1978 | Wolinski et al. | 260/879 |

Primary Examiner—William A. Powell  
Assistant Examiner—J. J. Gallagher  
Attorney, Agent, or Firm—Christel, Bean & Linihan

[57] ABSTRACT

Pipe sections of polyester fiberglass, epoxy fiberglass or of other diverse or same materials are adhesively joined together or to reaction vessels by applying to one mating surface an adhesive composition comprising a solution of non-reactive elastomer as for example, butadieneacrylonitrile rubber dissolved in a mixture of polymerizable acrylic monomers and acrylic acid monomer such as methyl methacrylate and acrylic acid, containing a polymerization catalyst such as benzoyl peroxide, and applying to the other mating surface a tertiary amine activator, bringing the mating surfaces together and allowing the adhesive to cure to a set. In another embodiment the tertiary amine is encapsulated in a rupturable microsphere and dispersed in the adhesive composition. The microspheres may be ruptured before or after the adhesive is applied.

20 Claims, No Drawings

4,200,480

ADHESIVE JOINING OF PIPES

CROSS-REFERENCE TO RELATED APPLICATIONS

This application is a continuation in part of Ser. No. 705,333 filed July 14, 1976, and now U.S. Pat. No. 4,080,238 continuation-in-part of Ser. No. 763,145 filed Jan. 27, 1977 now U.S. Pat. No. 4,126,504 and is related to U.S. Pat. No. 3,994,764, all assigned to the assignee of the present application.

BACKGROUND OF THE INVENTION

1. Field of the Invention

This invention relates to a method for adhesively joining pipes.

2. Description of the Prior Art

Pipes are currently joined by soldering, welding, threading, bonding with epoxy adhesives, bonding with polyvinylchloride adhesives in the case of PVC pipe, or using butts and straps. Threading, soldering and welding methods require skilled tradesmen and are therefor costly.

Epoxy adhesives are the bonding material of choice where the pipes are to be used to convey hot water or steam since they have the requisite chemical inertness and resistance to high temperatures. In addition, epoxy adhesives are particularly useful to join pipes of diverse materials. Adhesiveness may vary significantly from material to material with particular adhesives. Thus, an adhesive which is satisfactory for bonding steel may be inadequate for bonding a glass fiber reinforced resin. Epoxy adhesives have good adhesiveness with a broad range of materials and thus are extremely useful in bonding pipes having different compositions. As used, the epoxy adhesive comprises a two package composition which is mixed together prior to coating. The pot life of the mixed adhesive is short, being less than 30 minutes. After the pipe ends are coated and joined together the joints are heated, as by heating blankets, to accelerate the cure. Depending on the size of the joint, this takes from 10 to 60 minutes. During the heating step the epoxy adhesive becomes very fluid prior to cure. As a result, the adhesive flows out of the joint to form "icicles" which eventually harden and impede the flow of fluid through the pipe. As much as 75% of a pipe opening can be closed off due to the formation of "icicles" in this manner, and increased pumping costs and reduced efficiency of the piping system are the inevitable result. Also, because of the limited pot life of the epoxy adhesives when working with large diameter pipes, i.e., 6–12 inches, it is difficult to completely seal the surface before the adhesive sets up.

SUMMARY OF THE PRESENT INVENTION

The present invention is directed to a process for joining pipe of the same or diverse compositions by coating the ends to be joined with adhesives which have long pot lives and which avoid the problems encounted heretofore.

The main object of this invention is to provide a simple and relatively inexpensive process to join together pipe sections of the same or diverse compositions employing an adhesive having a long pot life, and requires no heat treatment or other external manipulative treatment to effect a cure, which does not obstruct the pipe interior which forms a strong bond, and which retains sufficient strength under hot water or steam temperatures and under adverse environmental conditions.

DESCRIPTION OF THE PREFERRED EMBODIMENTS

The difficulties enumerated above are obviated by employing the adhesives of U.S. Pat. No. 3,994,764 and applications Ser. Nos. 705,333 and 763,145 referred to above which are hereby incorporated by reference in this application.

The adhesive of U.S. Pat. No. 3,994,764 is a two part composition consisting of, as a first part, a solution of a non-reactive thermoplastic polyurethane polymer resin dissolved in a polymerizable acrylic monomer and co-polymerizable acid monomer, the solution containing a non-activated free radical polymerization catalyst having a half-life of at least one half hour at 80° C. The second part of the adhesive composition comprises a tertiary amine free radical polymerization catalyst activator.

Examples given in the patent of the acrylic and acid monomer are methacrylate esters and amides, methacrylic and acrylic acids and half esters of 2-hydroxyethyl acrylate with dicarboxylic acids, such as maleic, oxalic, itaconic, terephathilic and the like. The preferred catalyst is benzoyl peroxide and the preferred activator is a tertiary amine such as $R_1R_2R_3N$ wherein $R_1$ and $R_2$ are lower alkyl and $R_3$ is phenyl, tolyl or xylyl. Illustrative are N N, dimethyl-p-toluidine, dimethyl aniline or diethyl aniline. Salts of copper, lead or other heavy metals may be added to the accelerator to act as activators.

The first part of the adhesive has a high degree of stability in the absence of an activator for polymerization catalyst. In use, one surface is coated with the first part and the other surface with the second part. On joining the surfaces bonding takes place.

Application Ser. No. 705,333 is directed to a one-liquid adhesive, similar in composition to that disclosed in U.S. Pat. No. 3,994,764. Here, however, the amine activator is encapsulated in pressure rupturable microspheres which are normally insoluble in the adhesive mixture. In use the adhesive is coated on one or both surfaces, which are then joined together with sufficient pressure to break the microspheres. Alternatively the microspheres are ruptured in the adhesive mixture which is then applied.

Application Ser. No. 763,145 is similar to both 3,994,764 and Ser. No. 705,333. Instead of thermoplastic non-reactive polyurethane, this application employs as non-reactive elastomers in the adhesive composition rubbery polymers and copolymers derived from diolefins such as butadiene-1,3; isoprene; 2-3-dimethylbutadiene-1,3; 2-methyl pentadiene-1,3; 2-methyl-3-butyl butadiene-1, 3; 2,3-diethyl butadiene. The rubbery material may consist entirely of a natural rubber or a synthetic rubber diolefin, i.e. a homopolymer, although the diolefin rubbery polymers usually contain from about 5% to 40% of an olefinic modifying comonomer, such as those specified above, e.g. styrene, acrylonitrile, methyl methacrylate. Thus, such rubbers as styrene butadiene, butadiene-styrene-acrylonitrile, neoprene rubber, butyl rubber, silicone rubbers preferably other than dimethylsiloxanes, polysulfide rubber, polyacrylate rubber, pyridine butadiene rubbers, chlorosulfonated polyethylene, etc., may be used. The styrene-butadiene and acrylonitrilebutadiene rubbers are now generally referred to as SBR and NBR rubbers. Additionally, grafted rubbers may constitute the elastomeric polymer of the adhesive system. Such rubbers are prepared by grafting vinyl monomers, e.g. those mentioned above, onto the rubber polymer backbone by methods known in the art, e.g. emulsion polymerization. In addition to the rubbery material exemplified by the aforesaid, other elastomers which are non-reactive in the sense used herein may be employed; such as for example, poly ethers of epichlorohydrin. The elastomers employed do not react to any notable degree with any component of the adhesive composition. Both a two part adhesive formulation as in U.S. Pat. No. 3,994,764 and a one liquid formulation employing pressure rupturable microspheres encapsulating a tertiary amine activator as in Ser. No. 705,333 is shown in each of these prior adhesive compositions. Improved heat resistance above temperatures of 150° C. may be obtained by incorporating up to 20% (preferably 6–12%) of an epoxide resin not reactive with any of the other components of the adhesive formulation.

No preliminary preparation of the pipe surfaces is required in employing these adhesives. This is in marked contrast to the current methods employed with epoxy adhesives which require degreasing, sanding to remove any glossy plastic and roughen the surface, and the use of gloves to prevent surface contamination.

In the two part application, employing the adhesives of Ser. No. 763,145, the adhesive solution part is applied to one end of a pipe section and the activator is applied to a mating end of a second pipe section. Both sections are then brought together to form the joint, at which time the adhesive starts to cure. The joint sets, i.e. not movable by hand, in about 3 to 7 minutes.

In employing the one-liquid adhesives of Ser. No. 763,145, having rupturable microspheres containing the activator two alternate methods may be used. In one, the adhesives are applied to one end of a pipe section. A mating pipe section having a corresponding end adapted to put into the first pipe end is then joined to the first pipe section. The pressure generated by the pipe ends being fitted together ruptures the microspheres, releasing the activator and causes the adhesive to set. If desired, both pipe ends may be coated with the one-liquid adhesives. In the other method the microspheres are ruptured in the adhesive composition, as by passing the mixture through a gear pump. The adhesive is then applied to one or both ends of the pipe sections which are then joined together.

The cure takes place at room temperature and no "icicles" are formed resulting in a completely open pipe interior. Polyester or epoxy fiberglass pipes, joined with the adhesives described may be employed at temperature as high as 300° F. (148.9° C.).

The method set forth can be used to join a pair of diverse pipes made of polyester fiberglass, epoxy-fiberglass, polyvinylchloride, black iron, galvanized iron, copper, stainless steel, etc. It can be used for joining pipes to reaction vessels or process equipment. Leaks can be sealed readily by use of the adhesive and cured at room temperature.

EXAMPLE

Two sections of polyester-fiberglass reinforced pipe were joined together employing the adhesive of example 1 of Ser. No. 763,145.

33 grams of a high acrylonitrile/butadiene rubber, Hycar 1431, a commercially available product of B. F. Goodrich Co., Inc., was dissolved in a mixture of 33 grams of acrylic acid and 34 grams of methyl methacrylate. Thereafter 5 grams of benzoyl peroxide and 0.1 gram of hydroquinone were dissolved in the solution.

The foregoing solution was applied at a 10 mil thickness to one end of a pipe section. Dimethyl aniline was applied to a mating end portion of the other pipe specimen in an amount to form a layer of 0.05 mil thick. The two pipe sections were then joined with a light pressure by fitting one mating surface into the other to form the joint. The bond developed at room temperature withstood water immersion for 8 months without loss of strength. No decrease in the inside diameter of the pipe due to any adhesive exceeding or "icicle" formation was observed.

A number of pipes were treated and joined in this manner. Curing started when the pipe sections were brought together. The joint became "set" (not movable by hand) in 3 to 7 minutes at room temperature. Bond values were about 1100 psi average in shear tested at 0.2 inches per minute. Bond of 1400 psi were obtained with rupture of the plastic pipe.

In addition for use under elevated temperatures, the method described may be employed to join pipes which are to be exposed to other adverse environmental conditions such as solvents or strong caustic or acids. Although in the long run the adhesives may be affected by these substances, only a small exterior adhesive surface comes into contact with them, and the bulk of the adhesive is unaffected over a considerable period. Thus, the pipe junctions may be employed in these environments for substantial time periods before being replaced.

What is claimed:

1. A method for joining a pipe section with at least one end having a first mating surface,
    said section adapted to be joined to another element having a second mating surface adapted to fit together with and be joined to the first mating surface,
    applying to at least one of said mating surfaces a free radical polymerization catalyst activator,
    applying to at least one of said mating surfaces an activatable, curable adhesive comprising a solution of a non-reactive elastomeric polymer resin member selected from the group consisting of homopolymers of butadiene and lower alkyl substituted butadienes, copolymers of styrene or acrylonitrile or methylmethacrylate with butadiene or lower alkyl substituted butadienes, carboxy modified acrylonitrilebutadiene copolymers, neoprene, butyl rubber, silicones other than dimethyl silicone, polysulfide rubber, pyridinebutadiene copolymer, chlorosulfonated polyethylene, polyethers of epichlorhydrin, and the said polymers and copolymers having vinyl group-containing monomers grafted thereon,
    said member being dissolved in a free radical addition polymerizable acrylic monomer and a free radical addition polymerizable acid monomer co-polymerizable with said acrylic monomer,
    said solution containing a catalytically effective amount of a non-activated free radical addition polymerization catalyst having a half-life of at least about one-half hour at 85° C.,
    joining said mating surfaces in a contact relationship and activating the polymerization catalyst,
    and maintaining said contact relationship until said adhesive cures to a set.

2. The method of claim 1 wherein the adhesive solution comprises an acrylonitrile-butadiene rubber dissolved in methyl methacrylate and acrylic acid monomers and the polymerization catalyst is benzoyl peroxide.

3. The method of claim 1 wherein the activator comprises a tertiary amine of the formula $R_1R_2R_3N_1$ wherein $R_1$ and $R_2$ are lower alkyl and $R_3$ is phenyl, tolyl or xylyl; the adhesive solution comprises a non-reactive elastomeric polymer dissolved in methyl methacylate and acrylic acid monomers and the polymerization catalyst is benzoyl peroxide.

4. The method of claim 1 wherein said pipe section and the said other element are of the same composition.

5. The method of claim 1 wherein said pipe section and the said other element are of diverse compositions.

6. The method of claim 4 wherein the said other element is a pipe section.

7. The method of claim 5 wherein the said other element is a pipe section.

8. The method of claim 4 wherein said pipe section and said other element are selected from the class consisting of epoxy fiberglass and polyester fiberglass.

9. The method of claim 8 wherein the said other element is a pipe section.

10. The method of claim 2 wherein said other element is a pipe section and both pipe sections are selected from the class consisting of epoxy fiberglass and polyester fiberglass.

11. A method for joining a pipe section with at least one end having a first mating surface,
said section adapted to be joined to another element having a second mating surface adapted to fit together with and be joined to the first mating surface,
applying to at least one of said mating surfaces a free radical polymerization catalyst activator,
applying to at least one of said mating surfaces an activatable, curable adhesive comprising a solution of a non-reactive elastomeric polymer resin member selected from the group consisting of homopolymers of butadiene and lower alkyl substituted butadienes, copolymers of styrene or acrylonitrile or methylmethacrylate with butadiene or lower alkyl substituted butadienes, carboxy modified acrylonitrilebutadiene copolymers, neoprene, butyl rubber, silicones other than dimethyl silicone, polysulfide rubber, pyridinebutadiene copolymer, chlorosulfonated polyethylene, polyethers of epichlorhydrin, and the said polymers and copolymers having vinyl group-containing monomers grafted thereon,
said member being dissolved in a free radical addition polymerizable acrylic monomer and a free radical addition polymerizable acid monomer co-polymerizable with said acrylic monomer,
said solution containing a catalytically effective amount of a non-activated free radical addition polymerization catalyst having a half-life of at least about one-half hour 85° C.,
said solution having dispersed therein rupturable microspheres encapsulating a free radical polymerization activator whereby to form an adhesive dispersion,
in any order applying to at least one of said mating surfaces the adhesive dispersion and rupturing the microspheres
joining said mating surfaces in a contact relationship and
maintaining the contact relationship until the adhesive cures to a set.

12. The method of claim 11 wherein the non-reactive polymer is dissolved in methyl methacrylate and acrylic acid monomers, the polymerization catalyst is benzoyl peroxide, the activator is a tertiary amine $R_1R_2R_3N$ wherein R, and $R_2$ are lower alkyl radicals and $R_3$ is phenyl or tolyl or xylyl.

13. The method of claim 12 wherein the non-reactive polymer is an acrylonitrile-butadiene rubber.

14. The method of claim 11 wherein the adhesive dispersion is applied to at least one of said mating surfaces and joining said surfaces together in a contact relationship with a force sufficient to rupture the microspheres.

15. The method of claim 12 wherein the said other element is a pipe section and both pipe section are selected from the class consisting of epoxy giberglass and polyester fiberglass.

16. The method of claim 11 comprising first rupturing the microspheres in the dispersion then applying resultant adhesive composition to at least one of said mating surface, and joining said surfaces together in a contact relationship.

17. The method of claim 1, wherein the adhesive contains, in addition, up to 20% of an exoxide resin not reactive with any of the other components.

18. The method of claim 11, wherein the adhesive contains, in addition, up to 20% of an exoxide resin not reactive with any of the other components.

19. The method of claim 1, wherein the catalyst is activated by a tertiary amine.

20. The method of claim 11, wherein the catalyst is activated by a tertiary amine.

* * * * *